INVENTOR: IGOR B. POLEVITZKY

Fig. 5A
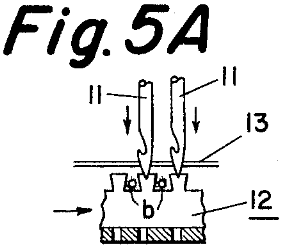
Fig. 5B
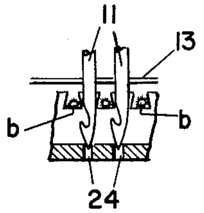
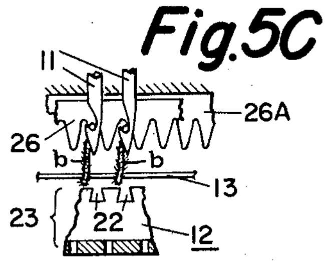
Fig. 5C
Fig. 6
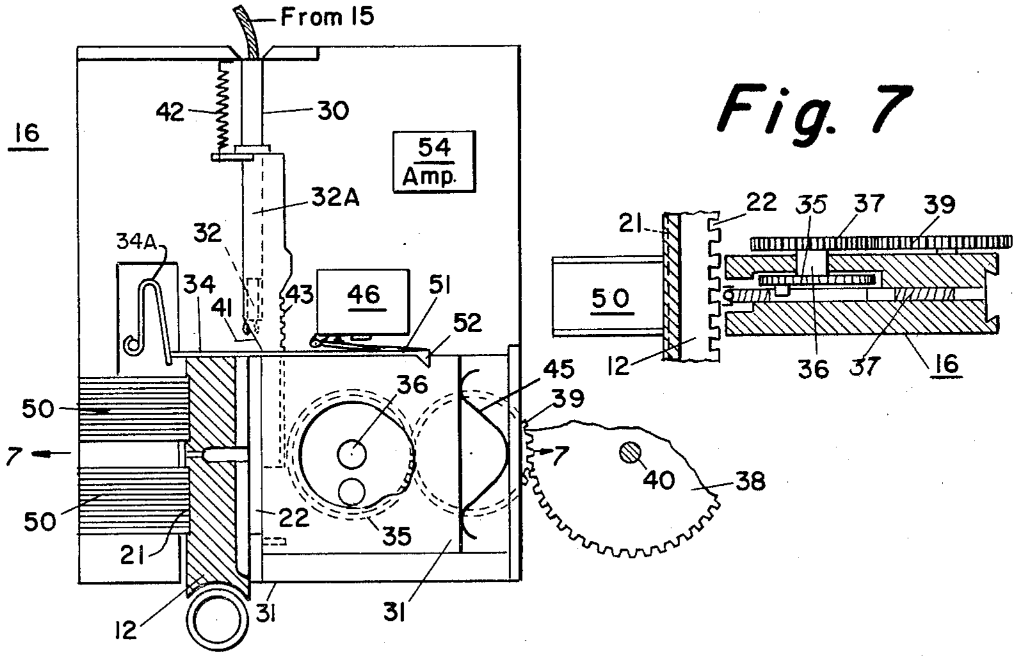
Fig. 6, Fig. 7

United States Patent Office 3,247,816

Patented Apr. 26, 1966

3,247,816

SYSTEMS AND METHODS FOR REPRODUCING COLOR PATTERNS IN CARPETS AND OTHER MANUFACTURED ARTICLES

Igor B. Polevitzky, Miami, Fla., assignor to Image Designs, Inc., New York, N.Y., a corporation of New York Filed Jan. 11, 1963, Ser. No. 250,901
24 Claims. (Cl. 112—79.5)

This invention relates to systems and methods for automatically reproducing in a manufactured article such as a carpet, rug or tapestry, for example, the color and design of a photograph, painting or other master pattern usually of smaller size than its reproduced article counterpart.

In various aspects the present invention is a modification of or an improvement upon the systems and methods disclosed in my copending applications Serial No. 108,633, filed May 8, 1961, now Patent No. 3,181,987, Serial No. 194,426, filed May 14, 1962 and Serial No. 235,770, filed November 6, 1962.

In accordance with the present invention, there is provided at least one group of colored materials substantially matching the colors in the pattern. The elemental areas of each pattern line are sequentially scanned for analysis of the color of each elemental area and from each analysis there is derived a coded signal representative of the color of the corresponding elemental area. These signals are utilized to select bits of the colored materials and to assemble them, as on conveyor means, in a line with the bits in sequence and color corresponding with a pattern line. The line of colored bits is then transferred en bloc to a backing layer of the article to reproduce the corresponding line of the pattern. This procedure is repeated for each line of the pattern until its reproduction in the manufactured article is complete.

More specifically, for the production of a rug, carpet or like textile article, the backing layer is fed step-by-step between a bit-conveyor charged with a line of colored yarn bits and a row of hooks which during a dwell in the backing layer feed are reciprocated to pierce the backing layer and to transfer thereto from the conveyor the line of colored yarn bits assembled thereon.

Also in accordance with the present invention, the bit-conveyor passes by or through at least one group of conveyor-charging devices loaded with the various colored materials and responsive upon signal to charge the conveyor with a corresponding color bit. Each charging device may itself be provided with a reading-head for selective response to a particular color signal as recorded on a tape or similar record element forming an integral part of the bit-conveyor.

Also in accordance with the present invention, the coded signal corresponding with the color of an elemental pattern area is derived by first determining the relative intensities of the red, green and blue components of light transmitted or reflected from the area and then computing from the intensities of said components the color value of the pattern area in an eight-color, 2-bit code involving at least one and not more than two of the colors red, green, blue, admixtures thereof, such as magenta, yellow and cyan, as well as black and white—the resulting coded bit-signal derived from scanning of an elemental pattern area, therefore defining a particular one of twenty-seven different colors available for reproduction of that area.

The invention further resides in novel and useful components, combinations and arrangements hereinafter described and claimed.

For a more detailed understanding of the invention, reference is made to the following description of a preferred embodiment thereof and to the accompanying drawings in which:

FIG. 1 schematically shows a system for manufacturing rugs, carpets or the like in accordance with control signals computed from analysis of light from a master pattern;

FIGS. 5A–5C are detail views, in section, showing successive stages in the transfer of yarn bits from the belt to a backing web;

FIG. 6 is an elevational view, in section, and on enlarged scale, of one of the belt-charging units of FIGS. 1 and 2;

FIG. 7 is a sectional view, on line 7—7, of FIG. 6;

Figure 1:
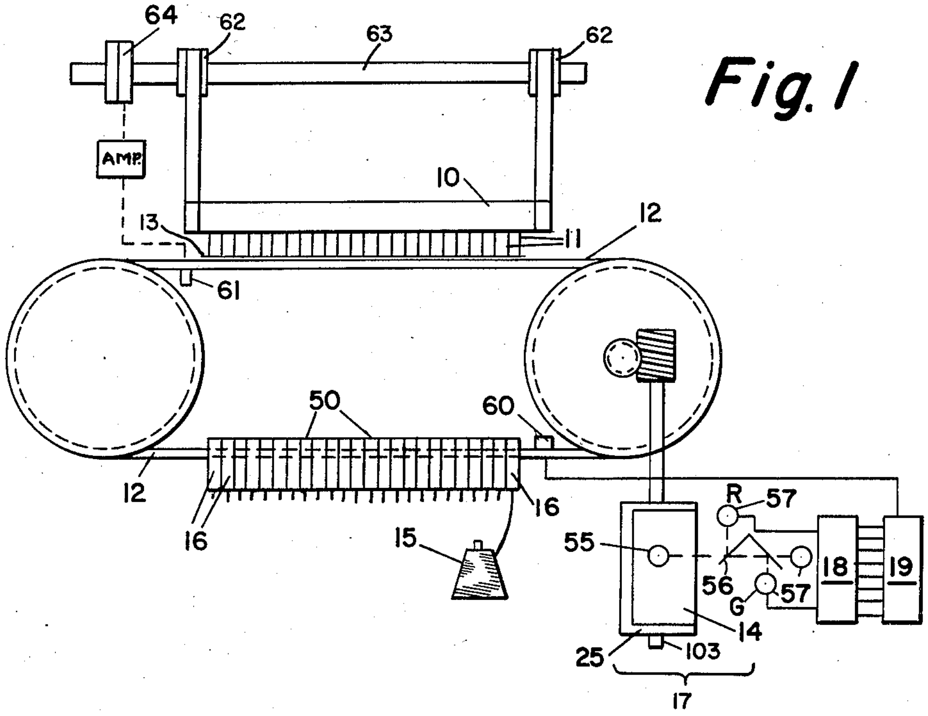
Figures 9, 10, 16, 17:
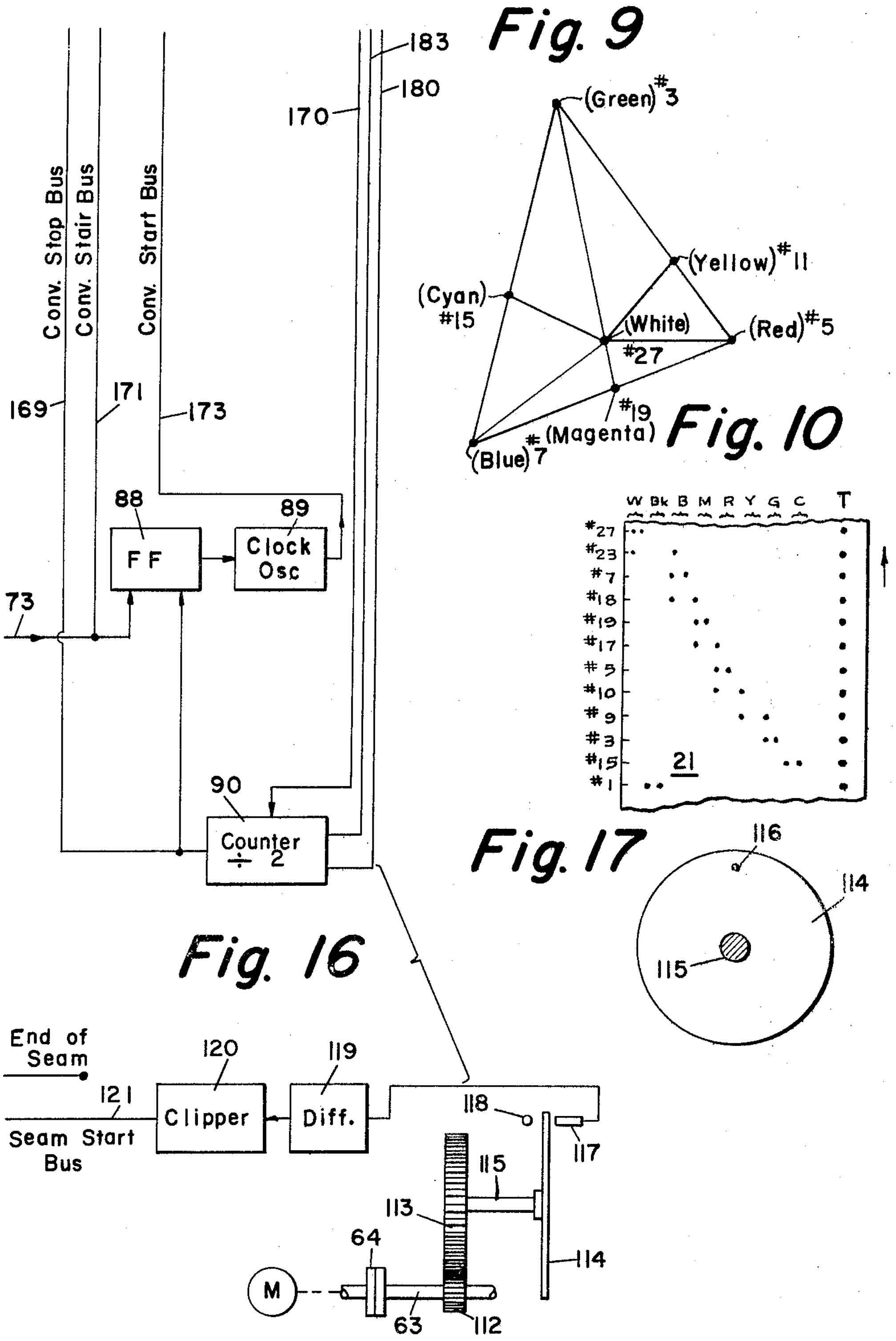
FIG. 9 is an explanatory figure relating to selected colors of the familiar spectral color triangle.
FIG. 10 is an explanatory view visibly showing the coding, on a short length of magnetic tape, of certain colors of FIG. 9.
Figures 11, 12A, 12B, 13:
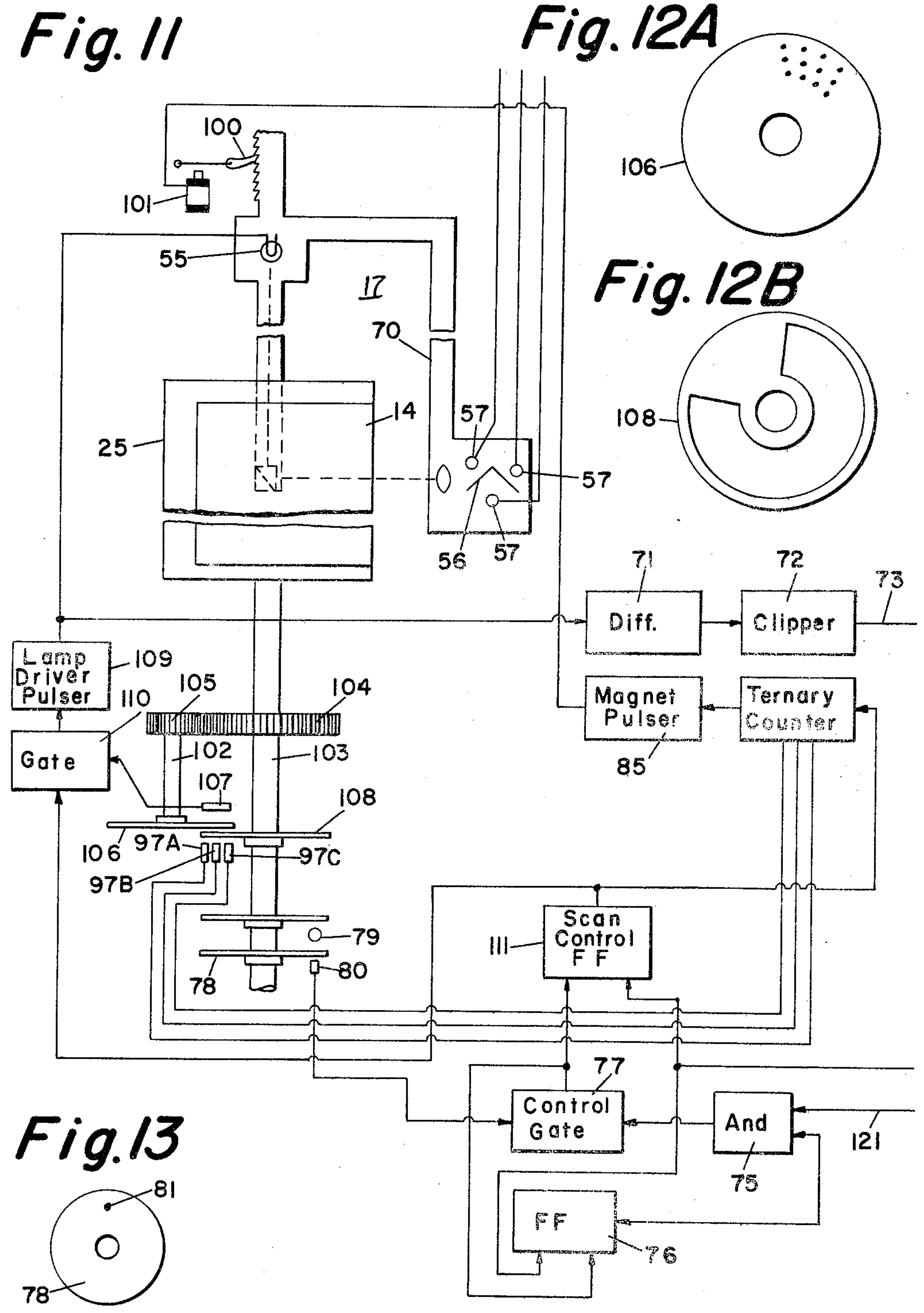
Figures 14, 18:
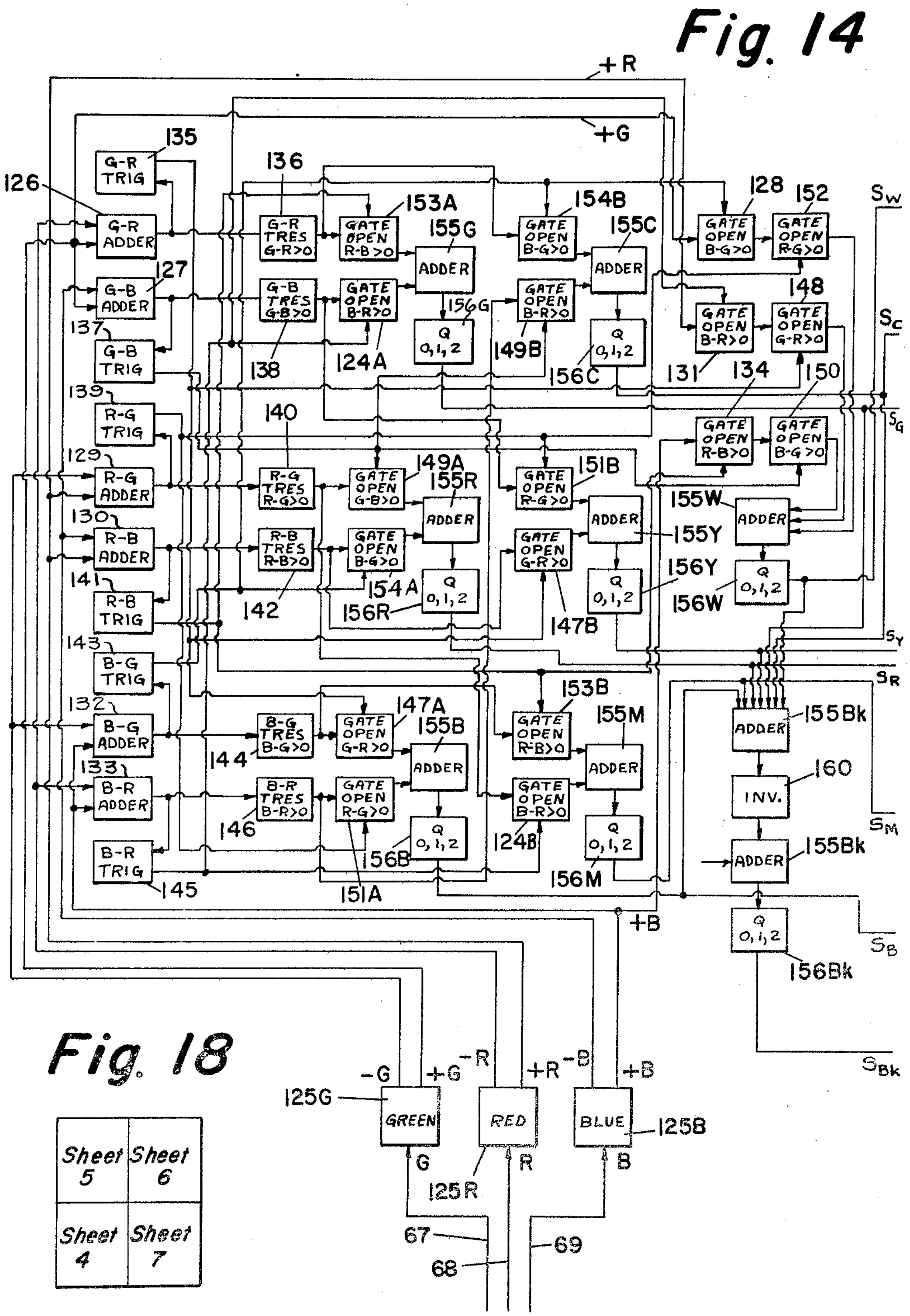
Figure 15:
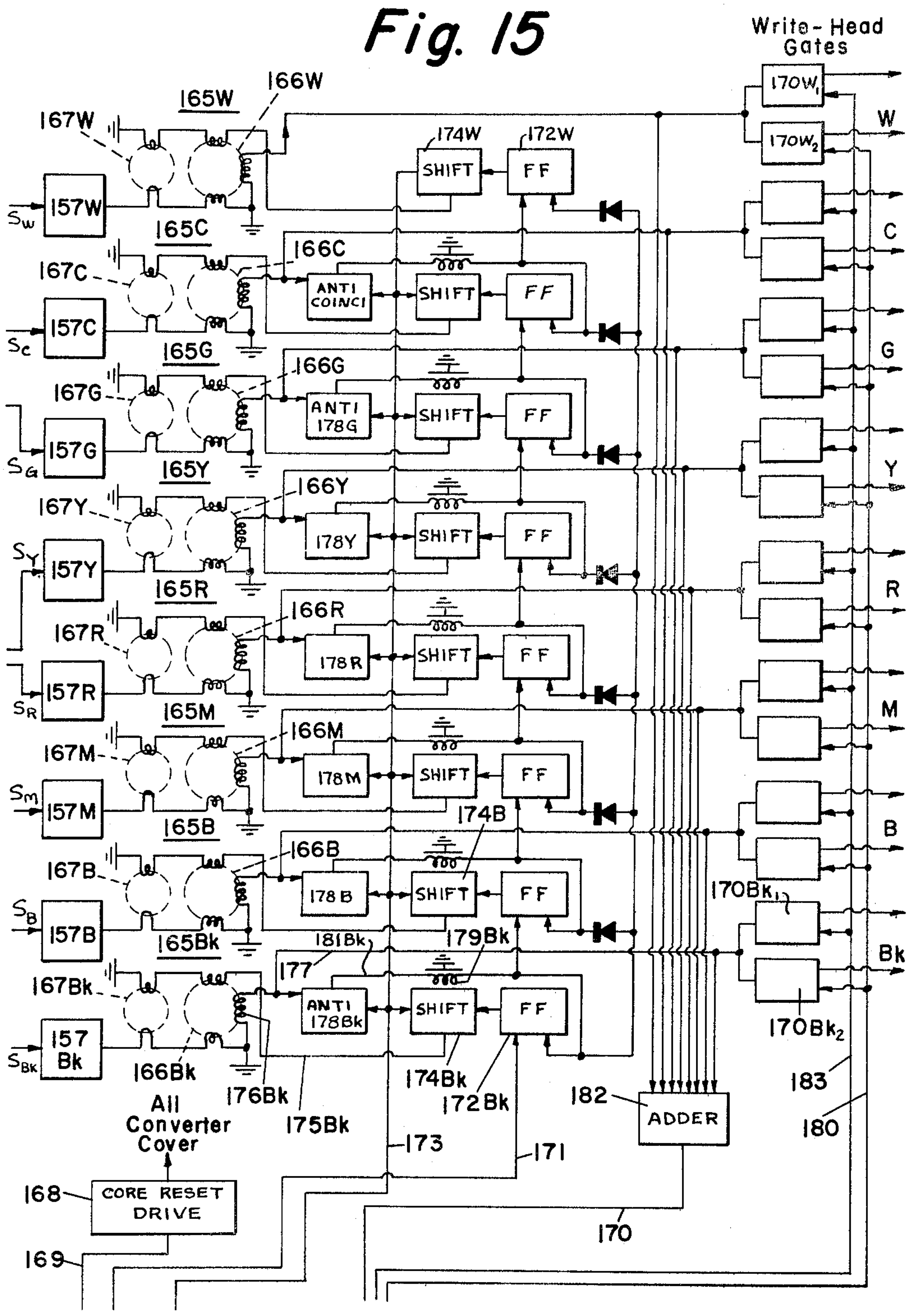

FIG. 11 in greater detail shows the scanner of FIG. 1 and the associated timing devices and circuitry;

FIGS. 12A, 12B and 13 are front views of commutator discs shown in FIG. 11;

FIG. 14 is a block diagram of a computer for converting three-color signals from the scanner to eight-color signals;

FIG. 15 is a block diagram of a converter for storing the computer signals and converting them to an eight-color, 2-bit code definitive of twenty-seven yarn colors;

FIG. 16 is a block diagram of timing devices and circuitry associated with the scanner of FIG. 11 and the converter of FIG. 15;

FIG. 17 is a front view of a commutator disc of FIG. 16; and

FIG. 18 shows the arrangement of Sheets 4–7 for interconnection of FIGS. 11, 14, 15 and 16 to form a complete system.

Figures 2, 2A, 3, 4:
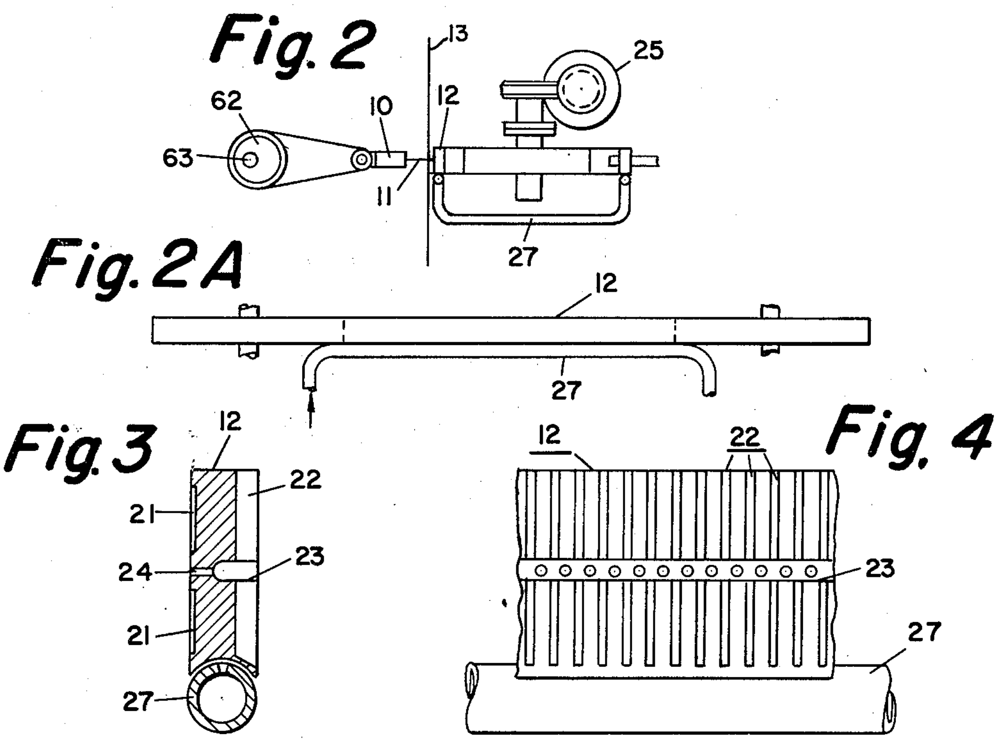
FIG. 2 is a partial end elevational view showing some of the components of the system of FIG. 1.
FIG. 2A is a detail view of a bit-conveyor shown in FIGS. 1 and 2.
FIG. 3 is a sectional view, in side elevation and on enlarged scale showing the relationship between the yarn conveyor belt of FIGS. 1 and 2.
FIG. 4 is a front view, on enlarged scale, of a short length of the belt of FIG. 3.

The system schematically shown in FIGS. 1 and 2 is for the manufacture of automatically tufted rugs, carpets or the like in color as an enlarged copy of a photograph, picture or other graphic pattern. By using an optical projector and an anamorphotic lens, the master 14 may have any desired aspect ratio so that the rug or carpet reproduced thereto may be fitted to odd sized rooms for wall-to-wall coverage. Whether of standard or odd size, each reproduction is unique and of no greater cost than a repetitive design. For each cycle of reciprocation of the bar 10, the array of needles or hooks carried thereby transfers from the belt 12 precut bits of yarn each of color corresponding with that of one of the successively scanned elemental areas of a line of the master 14. The bits or pieces of yarn are cut from the supply spools 15 which may be as small in number as the maximum number of colors to be used, for example, twenty-seven so that space requirements and delay time for yarn breakage is minimized. Selected bits or pieces of the colored yarn are first assembled in belt 12 in sequence corresponding with that of successively scanned elemental areas of the master 14.

The assembly of selected bits on belt 12 is effected by the charging mechanism 16 which is controlled by color information derived from the scanner 17. The color content of each elemental area of each line of the master is analyzed by computer 18 and transformed by the converter 19 into binary coded information recorded on tape 21 which preferably, and as more clearly shown in FIG. 3, is incorporated in the belt 12. Belt 12 as passing through the charging mechanism may be either in a vertical or horizontal plane and to avoid undue friction may be supported by a cushion of compressed air. In the arrangement shown, the belt is in a horizontal plane and air is supplied by guide pipe 27 from any suitable source (not shown). The grooves 22 for holding the yarn bits extend transversely of belt 12 with center-to-center spacing equal to that of the hooks 11—usually in the range of about ¼" to ⅛". The width of grooves 22 is slightly less than the normal average diameter of the uncompressed yarn bits so that after a bit is pushed into a groove, it is held or adheres therein because of the engagement of its fibers with the walls of the groove. The groove 23 extending lengthwise and centrally of the outer face of belt 12 is of width clearing the shanks of the hooks 11. The apertures or recesses 24 in the bottom of groove 23 are spaced to match the hook spacing. The inner face of belt 12 may be grooved to receive the strip or strips of magnetic tape 21 held in place as by suitable adhesive.

As shown in FIGS. 5A–5C, when the hooks 11 descend at their respective stations, they pierce the backing layer or web 13, of burlap, latex, thermoplastic or the like, and enter the groove 23 of belt 12 between adjacent bits *b* of yarn as held in adjacent grooves 22. In consequence of belt motion, the yarn bits are each pushed into the eye of a corresponding one of the hooks 11. As the hooks 11 move upward, they pull the yarn bits from the belt grooves and through the backing layer 13. Since the eyes of the hooks are filled by the loops of yarn, they do not tear the backing layer. The yarn loops may be pushed out of the eyes of the hooks as by a single comb 26 which moves to the left (FIG. 5C) as the needles 11 approach the end of their up-stroke, so to provide a rug or carpet with one side a tufted yarn reproduction of the master and the other side a looped yarn reproduction thereof. The mechanism for effecting such movement of comb 26 is per se known and need not be shown. Alternatively, the yarn loops may be cut from the hooks, as by a dual comb arrangement comprising a movable blade 26 and a fixed blade **26*a***. Suitable operating mechanism for such blade arrangement is per se known: see for example, Kleutgen, 876,562; Crawford, 2,556,068, and Felton, 2,987,019. In the latter case, both sides of the rug are a tufted or open pile reproduction of the master. If desired, the loops or tufts may be bonded to the backing layer as by subsequent application of a thermoplastic layer or by application of heat if the backing layer itself is thermoplastic.

Figure 8:
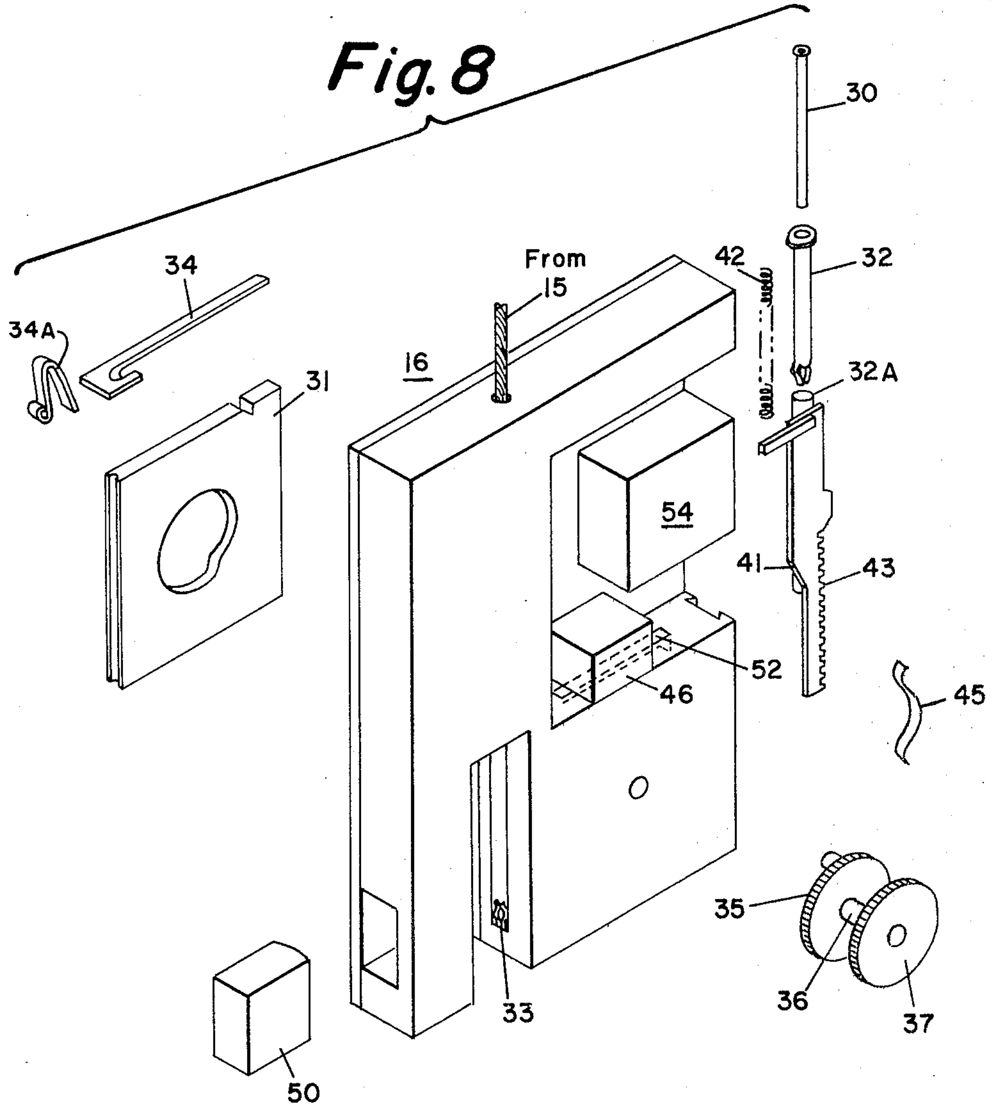
FIG. 8 is an exploded view showing in perspective components of the charging unit of FIG. 6.

Charging of belt 12 by yarn bits of a particular color is effected by a corresponding one of the charging units 16. As shown in FIGS. 6–8, which illustrate one example of the charging unit construction, a yarn end from one of spools 15 is guided by tube 30 to a position just short of the path of the plunger 31. The purpose of the longer outer tube 32 is to grip the free end of the yarn as protruding beyond guide tube 30 to move it on signal into the clip 33, and then return to its initial position shown by sliding along the yarn. The purpose of plunger 31 is twofold: first, on signal, it pushes the end portion of the yarn from clip 33 to compress it in a groove 22 of the belt 12; and, secondly, it concurrently coacts with the spring-biased knife 34 to cut off said end portion of the yarn. The adherence of the yarn bits to the belt grooves may be enhanced by electrostatic charging of the belt and yarn.

The charging unit 16, as shown in FIG. 6, is normally cocked and loaded with yarn of a particular color awaiting a corresponding command signal on the multi-channel magnetic tape 21. Upon receiving such command, the plunger 31 of the unit moves upwardly to deposit a bit or piece of that yarn in the proper groove of belt 12 and is then immediately automatically re-cocked and loaded. The plunger 31 is returned to the cocked position by its engagement with the eccentric 35. This eccentric is continuously rotated by a shaft 36 and gear 37. The gears 37 and 39 of each charging unit 16 are continuously operated by gear 38 on shaft 40 common to all units 16.

As the plunger 31 is moved to cocked position, it compresses firing spring 45 which is held in compressed state until the trigger relay 46, on command, releases the plunger 31. As knife 34 descends to cut off the yarn bit, it engages the cam plate 41 on tube 32A to effect engagement between gear 35 and the rack 43 also attached to tube 32A. Thus, tube 32A is moved downwardly first to compress the jaws of feed tube 32 on the yarn; as its motion continues, it moves the feed tube 32 to bring the end of the yarn between the jaws of the plunger clip 33. At the end of the rack stroke, the tube assembly rocks away from gear 35, spring 42 moves tube 32A upwardly first to release the yarn, and then to return it, together with tube 32, to its original position (FIG. 6) whereupon the knife 34 is permitted by cam 41 to return to its original position where it is restrained by latch 52 from further movement by its biasing spring. With its plunger 31 latched down, its knife 34 latched up, and the tubes 32, 32A in retracted position, the charging unit 16 is now again on standby ready to deliver, upon command, a yarn of particular color to a groove of belt 12.

As stated above, there is a different unit 16 for each different color. The dual reading-head 50 incorporated in each unit is in a single signal channel and responds only to that particular color-coded signal on tape 21 which corresponds with the color yarn supplied to that unit. A solid state amplifier 54 incorporated in each unit 16 amplifies the output signal of the reading-head to energize the relay 46 whose arm 51 moves latch 52 from latching engagement with plunger 31 and knife 34. The spring 45 thereupon propels the plunger 31 to deposit that color bit demanded by the tape signal into the belt groove 22 and the biasing spring 34A for knife 34 propels the knife in opposite direction to coact with the edge of the plunger to cut off one bit length from the yarn supplied to the unit.

By combining the memory and charging operations in the same belt structure, there are avoided registration problems otherwise arising because of effects such as belt stretching with use, and expansion and contraction of the belts with temperature. With the reading-head and amplifier for a particular color contained within the charging unit for that color, there are no electrical interconnections required between the various charging units, and in fact the only external connection is the power lead. With self-contained units, any malfunction of the belt-charging system may be quickly corrected by replacement of a charging unit. It is also to be noted that since the height of the loops or tufts is determined by the lengths of the individual yarn bits, a sculptored surface on the rug may be obtained simply by using charging units 16 of different effective length, i.e., having greater or lesser spacing between blade 34 and stop clip 33.

The command pulses which control the charging unit 16 are derived from the scanner 17 and the associated computer and converter circuits 18 and 19 generally similar to those disclosed in my copending application Serial No. 235,770. Briefly, the scanner 17 comprises a drum 25 which is rotated in synchronism with motion of the belt 12. The colored master 14 to be reproduced is wrapped about the periphery of the drum and its surface is scanned by a pulsed beam of light from source 55. The light pulse reflected from or passed by each elemental area of master 14 is divided by the filter arrangement 56, such as a dichroic mirror, into its fundamental components, red, blue and green. The three beams emerging from the filter respectively activate the three photocells 57 to produce signal pulses $E_R$, $E_G$, $E_B$ respectively of amplitude representative of the content of red, green and blue in the color of the scanned elemental area of the master. For simplicity of explanation, it is for the moment assumed these signals have been quantized, so that each has a value of 0, 1 or 2.

Each group of three signal pulse $E_G$, $E_R$, $E_B$ is combined in the color computer 18 to provide eight color output signals $S_R$, $S_G$, $S_B$, $S_M$, $S_C$, $S_Y$, $S_{BK}$ and $S_W$, each having a value of 0, 1 or 2 and respectively representing the colors red, green, blue, magenta, cyan, yellow, black and white. Thus, as more clearly appears from Table A below, the signals $E_G$, $E_B$, $E_R$ for each elemental area of the master 14 results in a converter output signal having a value of 2 for one of these 8-colors or a value of 1 for each of two of these 8-colors so affording twenty-seven different color-code combinations.

*Table A*

| Input Signal | | | Output Signal | | | | | | | | Yarn Color No. |
|---|---|---|---|---|---|---|---|---|---|---|---|
| $E_G$ | $E_R$ | $E_B$ | W | Bk | B | M | R | Y | G | C | |
| 0 | 0 | 0 | 0 | 2 | 0 | 0 | 0 | 0 | 0 | 0 | 1 |
| 1 | 0 | 0 | 0 | 1 | 0 | 0 | 0 | 0 | 1 | 0 | 2 |
| 2 | 0 | 0 | 0 | 0 | 0 | 0 | 0 | 0 | 2 | 0 | 3 |
| 0 | 1 | 0 | 0 | 1 | 0 | 0 | 1 | 0 | 0 | 0 | 4 |
| 0 | 2 | 0 | 0 | 0 | 0 | 0 | 2 | 0 | 0 | 0 | 5 |
| 0 | 0 | 1 | 0 | 1 | 1 | 0 | 0 | 0 | 0 | 0 | 6 |
| 0 | 0 | 2 | 0 | 0 | 2 | 0 | 0 | 0 | 0 | 0 | 7 |
| 1 | 1 | 0 | 0 | 1 | 0 | 0 | 0 | 1 | 0 | 0 | 8 |
| 2 | 1 | 0 | 0 | 0 | 0 | 0 | 0 | 1 | 1 | 0 | 9 |
| 1 | 2 | 0 | 0 | 0 | 0 | 0 | 1 | 1 | 0 | 0 | 10 |
| 2 | 2 | 0 | 0 | 0 | 0 | 0 | 0 | 2 | 0 | 0 | 11 |
| 1 | 0 | 1 | 0 | 1 | 0 | 0 | 0 | 0 | 0 | 1 | 12 |
| 2 | 0 | 1 | 0 | 0 | 0 | 0 | 0 | 0 | 1 | 1 | 13 |
| 1 | 0 | 2 | 0 | 0 | 1 | 0 | 0 | 0 | 0 | 1 | 14 |
| 2 | 0 | 2 | 0 | 0 | 0 | 0 | 0 | 0 | 0 | 2 | 15 |
| 0 | 1 | 1 | 0 | 1 | 0 | 1 | 0 | 0 | 0 | 0 | 16 |
| 0 | 2 | 1 | 0 | 0 | 0 | 1 | 1 | 0 | 0 | 0 | 17 |
| 0 | 1 | 2 | 0 | 0 | 1 | 1 | 0 | 0 | 0 | 0 | 18 |
| 0 | 2 | 2 | 0 | 0 | 0 | 2 | 0 | 0 | 0 | 0 | 19 |
| 1 | 1 | 1 | 1 | 1 | 0 | 0 | 0 | 0 | 0 | 0 | 20 |
| 2 | 1 | 1 | 1 | 0 | 0 | 0 | 0 | 0 | 1 | 0 | 21 |
| 1 | 2 | 1 | 1 | 0 | 0 | 0 | 1 | 0 | 0 | 0 | 22 |
| 1 | 1 | 2 | 1 | 0 | 1 | 0 | 0 | 0 | 0 | 0 | 23 |
| 2 | 2 | 1 | 1 | 0 | 0 | 0 | 0 | 1 | 0 | 0 | 24 |
| 1 | 2 | 2 | 1 | 0 | 0 | 1 | 0 | 0 | 0 | 0 | 25 |
| 2 | 1 | 2 | 1 | 0 | 0 | 0 | 0 | 0 | 0 | 1 | 26 |
| 2 | 2 | 2 | 2 | 0 | 0 | 0 | 0 | 0 | 0 | 0 | 27 |

As apparent from Table A, the output from converter 19 resulting from scanning of any particular elemental area of the master 14 may be any one of twenty-seven different combinations of the eight-color, 2-bit code. Thus, the output from converter 19 may be used to call for any one of the colors selected for the twenty-seven yarn supply spools 15. The general location of these colors with respect to the familiar color triangle may be as indicated in FIG. 9.

To record the twenty-seven different color numbers in binary code on the magnetic tape 21, a writing head 60 (FIG. 1) with eight pairs of gaps may be used. This head may have an additional pair of gaps for tallying or accounting purposes. Since this type of head is a standard piece of equipment in many computing machines, it is not necessary to further described it here. The writing head 60 is positioned in advance of the array of charging units 16. As the tape 21 passes by the writing head, there is magnetically recorded thereon the coded color information corresponding with the sequentially scanned elemental areas of a line of the master 14. FIG. 10 is exemplary of a short length of such tape with legends correlating various recorded signals to the yarn colors and converted output headings of Table A: With each 2-bit color signal may be associated a tally signal T if such signals are to be used for counting purposes. The positions of the 2-bit signals lengthwise of the tape 21 correspond with the positions of successive elemental areas of a line of the pattern 14 and the lateral position of the bits of each signal is definitive of the color of the corresponding elemental area of the pattern. Each signal is a "Yes" signal for one of the charging units and a "No" signal for all the rest of them.

At the end of a line scan, the tape 21 has recorded thereon in proper sequence and at intervals corresponding with the hook spacing all of the color information required to charge the belt 12 with the proper yarn bits for color reproduction of a line of the master 14.

At the end of a line scan, scanner 17 is caused to stop recording by switching off the source 55 of scanning light. The belt continues in motion and repeatedly passes through the charging head array at suitably high speed. As each color-coded signal on the tape passes through charging unit 16 which is loaded with the color yarn called for by that signal, the reading-head 50 of that charging unit recognizes the signal and in response deposits a bit of that color yarn in a groove of the belt. As soon as each charger 16 is so activated, that particular signal is erased from the tape together with the accompanying tally signal T which through a counter circuit keeps track of the number of yarn bits deposited in the belt grooves 22.

When all color signals have been utilized by the charging units 16 to assemble a complete line of yarn bits in the belt, the counting circuit produces a signal which may slow down the belt. Such signal at the same time causes the writing head 60 to record a command signal on tape 21, which command signal, upon the belt coming in proper coincidence with the array of hooks 11, is effective through reading-head 61 to activate the magnetic clutch 64 and initiate a cycle of the loom mechanism during which the hooks 11 reciprocate as previously described to remove the assembled yarn bits from belt 12 and attach them to the backing web 13 so to reproduce a line of the master 14. Thereafter, in the loom cycle, the web 13 is advanced by the width of one line to the rug. The aforesaid operations of scanning a line of the master, charging the belt with the selected yarn bits, transferring a line of yarn bits to the backing web, and advancing the backing web are repeated until the surface of the rug is a reproduction in design and color of the master 14.

The loom mechanism, except for the scanner and charged belt arrangements above described, may be similar to that of a commonly used tufting machine in that the needle bar 10 is reciprocated by eccentric 62 (FIGS. 1, 2) on a drive shaft 63 and operates in timed relation to the mechanism which advances the backing web 13. It differs therefrom in that the drive shaft 63 for the needle bar and web-feed mechanism is coupled to the drive motor by magnetic clutch 64, or equivalent device, responsive to a signal produced when the belt 12 is fully charged and with its charged section in position below hooks 11. It also differs in that the number of yarn spools 15 is equal, or proportional to the number of colors used, and is disproportionately smaller than the number of needles or hooks.

In brief résumé of a complete cycle of operation of the system, with the scanning drum 25 in zero position, the scanning of a line of the master pattern 14 is initiated by a clock signal. During scanning of a line, the color information of the successive elemental areas of the pattern is converted to binary-coded signals on tape 21. Upon completion of a line scan, the scanner ceases giving information until completion of the yarn-transfer operation. During this interval, the light source and scanner are advanced one line and scanning of the next line begins upon reception of an initiating signal. The tape signals are utilized to charge the belt 12 with bits of yarn in the same color sequence as the elemental areas of the scanned line of the master.

Assuming all other factors are the same, the time required to reproduce a line of the master is inversely related to the number of colors in it. Analysis of a random line of any colored picture indicates that the occurrence of any one color is small compared to the sum of the occurrences of the rest of the twenty-seven colors. In short, reproduction of a line for a single color is the slowest since loading of the belt is from only one charger 16 per pass of the belt through the array of charger units whereas if all twenty-seven colors are required for one line, the assembly of yarn bits is twenty-seven times faster because all chargers 16 are active per pass of the belt. The time of assembly of the average line will be between these limits and the time of assembly of a large area in full color will be much shorter than the assembly of the same area in monochrome. The speed of assembly may be increased by increasing the number of arrays of charger units 16, each set or array having twenty-seven units.

A suitable scanning arrangement 17 for the system of FIGS. 1 and 2 is shown in FIG. 11. The scanning carriage-unit 70—including lamp 55, the lens and prism system within the scanner drum 25, and the photocells 57 externally of the drum—is movable longitudinally of the drum by a stepping motor including magnet 101 and its armature 100. The stepping of the motor is controlled by timing circuits later described.

The transparent master 14 is of such size, preselected by photographic techniques, that the area to be reproduced in weaving of the rug covers about 80% of the periphery of drum 25, leaving the remainder free to accommodate clamping devices for securing the master to the drum. The arrangement for controlling the pulse-excitation of the scanner lamp 55 includes a commutator shaft 102 driven by drum shaft 103 and gears 104, 105. The shutter disc 106 on shaft 102 rotates between photocells 107 and exciter lamps 97A–97C. The auxiliary disc 108, having 80% open area (FIG. 12B) is also interposed between photocell 107 and the exciter lamps. By properly phasing the disc 108 on shaft 103, the output pulses of photocell 107 span the time interval for scanning of a line of the master 14.

The output pulses of photocell 107 are not applied directly to the light driver amplifier 109 but to one input circuit of the electronic gate 110 whose other input circuit is supplied from the flip-flop circuit 111. At the beginning of a line scan, the flip-flop circuit is switched to the ON state and is switched to the OFF state at the end of a line scan. With flip-flop 111 in the ON state, the photocell output pulses corresponding with successive incremental areas of the master 14 are applied to the driver 109 to pulse-excite lamp 55 of the scanner unit 70. Thus, as each elemental area of the master is scanned, a corresponding group of $E_G$,$E_R$,$E_B$ signals is produced by the three photocells 57 of the scanning unit 70. These signals are supplied to computer 18 (FIG. 14, Sheet 5) via lines 67, 68, 69. The output pulses of the lamp driver 109 after shaping by the differentiating circuits 71, 72 are also applied via line 73 to timing circuits of FIG. 16 to provide the Converter-Stop signal later discussed.

In the color computer of FIG. 14 which is suited for producing the 2-bit, eight-color code of Table A, the $E_G$, $E_R$, $E_B$ signals from the scanner are respectively applied to the inverter amplifiers 125G, 125R, 125B. Each of these amplifiers produces a pair of positive and negative output signals each proportional to the input signal. The positive output +G of inverter 125G is applied as one of the inputs of adders 126, 127 and gate 128. The positive output +R of inverter 125R is applied as one of the inputs of adders 129, 130 and gate 131. The positive output +B of inverter 125B is applied as one of the inputs of adders 132, 133 and gate 134. The negative output −G of inverter 125G is applied as the second input of each of adders 129 and 132. The negative output −R of inverter 125R is applied as the second input of each of adders 126 and 133. The negative output −B of inverter amplifier 125B is applied as the second input of each of adders 127 and 130.

The output of the G–R adder 126 is applied as the sole input of the trigger circuit 135 and of the threshold circuit 136. The output of the G–B adder 127 is applied as the sole input of the trigger circuit 137 and of the threshold circuit 138. The output of the R–G adder 129 is applied as the sole input of the trigger circuit 139 and of the threshold circuit 140.

The output of the R–B adder 130 is applied as the sole input of trigger circuit 141 and of the threshold circuit 142. The output of the B–G adder 132 is applied as the sole input of trigger circuit 143 and of the threshold circuit 144. The output of the B–R adder 133 is applied as the sole input of the trigger circuit 145 and of the threshold circuit 146.

The output of the G–R trigger circuit 135 is applied as one input of the G–R gate 147A whose other input is the output of the B–G threshold circuit 144. The output of trigger circuit 135 is also applied as one input of the G–R gate 147B whose other input is the output of the R–B threshold circuit 142. The output of trigger circuit 135 is also applied as one input of the G–R gate 148 whose other input is supplied by the output of the B–R gate 131.

The output of the G–B trigger circuit 137 is applied as one input of the G–B gate 149A whose other input is supplied by the output of the R–G threshold circuit 140. The output of trigger circuit 137 is also applied as one input of the G–B gate 149B whose other input is supplied by the output of the B–R threshold circuit 146. The output of trigger circuit 137 is also applied as one input of gate 150 whose other input is the output of the gate 134. The output of the R–G trigger circuit 139 is applied as one input of the R–G gate 151A whose other input is supplied by the B–R threshold circuit 146. The output of trigger circuit 139 is also applied as one input of the R–G gate 151B whose other input is supplied by the G–B threshold circuit 138. The output of trigger circuit 139 is also applied as one input of R–G gate 152 whose other input is the output of gate 128.

The output of the R–B trigger circuit 141 is applied as one input of gate 153A whose other input is supplied by the G–R threshold circuit 136. The output of trigger circuit 141 is also applied as one input of gate 153B whose other input is supplied by the B–G threshold circuit 144. The output of trigger circuit 141 is also applied as one input of gate 134 whose other input, as above noted, is the B+ output of inverter 125B.

The output of the B–G trigger circuit 143 is applied as one input of gate 154A whose other input is supplied by the R–B threshold circuit 142. The output of trigger circuit 143 is also applied as one input of gate 154B whose other input is supplied by the G–R threshold circuit 136. The output of trigger circuit 143 is also applied as one input of gate 128 whose other input, as above noted, is the +G output of inverter 125G.

The output of the B–R trigger 145 is applied as one input of gate 124A whose other input is supplied by the G–B threshold circuit 138. The output of trigger 145 is also applied as one input of gate 124B whose other input is supplied by the R–G threshold circuit 140. The output of trigger 145 is also applied as one input of gate 131 whose other input, as previously noted, is the +R output of inverter 125R.

The output circuits of the R–B gate 153A and the B–R gate 124A are connected to the Green adder circuit 155G to supply thereto, when $E_G$ is the largest of three unequal signals, an analog signal representative of the amount by which the Green exceeds Red or Blue. Since such analog values are seldom whole numbers, the output of adder 155G is applied to a quantizing circuit 156G whose output has three arbitrarily assigned levels 0, 1, 2. The output of the Green quantizer 156G is applied to one of the input circuits of the not-black adder $155\overline{Bk}$ and to the Green output line of the computer circuit.

The output circuits of the G–B gate 149A and the B–G gate 154A are connected to the Red adder circuit 155R to supply thereto, when $E_R$ is the largest of three unequal color signals, an analog signal representative of the amount by which the Red exceeds the Green or Blue components of the elemental area of the master. The output of the adder 155R as converted to an integral value by quantizer 156R is applied to one of the input circuits of the not-black adder $155\overline{Bk}$ and to the Red output line of the computer circuit.

The output circuits of the G–R gate 147A and the R–G gate 151A are connected to the Blue adder circuit 155B to supply thereto, when $E_B$ is the largest of three unequal color signals, an analog signal representative of the amount by which Blue exceeds the Green or Red component of an elemental area of master 14. The output of adder 155B as converted to an integral value by quantizer 156B is applied to one of the input circuits of the not-black adder $155\overline{Bk}$ and to the Blue output line of the computer 18.

The output circuits of the B–G gate 154B and the G–B gate 149B are connected to the Cyan adder circuit 155C to supply thereto an analog signal representative of the extent of equality of the Green and Blue signals from a scanned elemental area of master 14. The output of adder 155C as converted to one of the integral values 0, 1, 2 by quantizer 156C is applied to one of the input circuits of the not-black $155\overline{Bk}$ and to the Cyan output line of computer 18.

The output circuits of the R–G gate 151B and the G–R gate 147B are connected to the Yellow adder circuit 155Y to supply thereto an analog signal representative of the extent of equality of the Red and Green signals from the scanned elemental area of master 14. The output of adder 155Y as converted to one of the values 0, 1, 2 by quantizer 156Y is applied to one of the input circuits of the not-black adder $155\overline{Bk}$ and to the Yellow output line of computer 18. The output circuits of the R–B gate 153B and the B–R gate 124B are connected to the Magenta adder circuit 155M to supply thereto an analog signal representative of the extent of equality of the Red and Blue signals from the scanned elemental area of master 14. The output of adder 155M as converted to one of the values 0, 1, 2 by quantizer 156M is applied to one of the input circuits of the not-black adder $155\overline{Bk}$ and to the Magenta line of computer 18.

The output circuits of the R–G gate 152, the G–R gate 148 and the G–B gate 150 are connected to the White adder circuit 155W to supply thereto an analog signal representative of the extent of equality of the Red, Green and Blue signals from the scanned elemental area of master 14. The output of adder 155W as converted to one of the values 0, 1, 2 by quantizers 156W is applied to one of the input circuits of the not-black adder $155\overline{Bk}$ and to the White output line of computer 18.

The outputs of the quantizers 156G, 156R, 156B, 156C, 156Y, 156M and 156W as applied to the not-black adder $155\overline{Bk}$ produce a negative output having one of the integral values from 0 to 8. This output is inverted by the inverter circuit 160 and applied effectively to reduce the output of the Black adder 155B*k*. For a 0, 1 or 2 output of inverter 160, the black adder 155B*k* supplies to the Black output line of computer 18 via quantizer 156B*k* a Black signal $S_{Bk}$ having a value of 2. For an inverter output having the value of 3, 4 or 5, the Black signal $S_{Bk}$ has a value of 1; for an inverter output having the value of 6, 7 or 8, the Black signal $S_{Bk}$ has a value of 0.

In brief, for all the concurrent values of the three computer input signals $E_G$, $E_R$, $E_B$, there is produced a set of at least one and not more than two of the output signals $S_W$, $S_C$, $S_G$, $S_Y$, $S_R$, $S_M$, $S_B$, $S_{Bk}$. The total or sum value of such output signal or signals from computer 18 is 2 (see Table A).

The output signals of computer 18 are respectively applied to the eight driver amplifiers 157W, 157C, 157G, 157Y, 157R, 157M, 157B, 157B*k* of the converter 19 (FIG. 15). The output of each of the driver amplifiers is applied to the corresponding one of the shift registers 165W–165B*k*. All of the registers may be of the magnetic core type and each comprises two cores.

The input windings for the cores 166W, 167W of the White register 165W respectively have such number of turns that when the signal $S_W$ has a value of 2, both cores are switched from the 0 state to the 1 state whereas when signal $S_W$ has a value of 1, only the core 166W is switched to the 1 state. The input windings of the two cores of the rest of the registers are similarly proportioned, the corresponding cores being identified by the same reference numbers plus a letter suffix corresponding with the particular color.

The color information stored in cores of each of the registers is transferred to the writing head 60 of FIG. 2 via a pair of writing-head gates (170B*k*$_1$, 170B*k*$_2$, 170W$_1$, 170W$_2$) interposed between that register and a pair of writing coils spaced within head 60 transversely of tape 21, thus to record whether the value of the particular stored color is 0, 1 or 2. As will appear, the eight-color registers 165B*k*–165W are interrogated in sequence—thus to space the 2-bit color information lengthwise of tape 21, as shown in FIG. 10. After each register has passed its color information, the next register is interrogated to determine whether its stored color has a value of 0, 1 or 2, and so on for each successive register. Thus, at the end of a line scan, the $E_G$, $E_R$, $E_B$ signals for each of the successively scanned elemental areas of that line have been recorded on tape 21 in binary-coded form corresponding with one of the twenty-seven colors of Table A.

A Converter-Start pulse appearing on line 171 (FIG. 15) switches the flip-flop circuit 172B*k* to produce an output for one of the input circuits of the Black shift-gate 174B*k*. Thus, when a series of clock pulses is produced on line 173 as later described, the first pulse of the series enables the other input circuit of shift-gate 174B*k* to produce an interrogating pulse on line 175B*k* which is coupled to both cores of the Black register 165B*k*.

If neither of the cores of register 165B*k* is in the 1 state, the output coil 176B*k* produces no output on line 177B*k* to the pair of write-head output gates 170B*k*$_1$, 170B*k*$_2$. Also in such event, the anti-coincidence circuit 178B*k* is effective to produce an output pulse on line 181B*k* which, after a brief delay of say five microseconds introduced by delay line 179B*k*, is effective both to reset the flip-flop 172B*k* for closure of the shift-gate 174B*k* and to switch ON Blue flip-flop 172B to apply a signal to one input circuit of the Blue shift-gate 174B.

If, on the other hand, at least the core 166B*k* of register 165B*k* is in the 1 state, the first clock pulse of the series is repeated as an interrogation pulse on line 175B*k* so to produce an output signal by coil 176B*k*. This pulse signal is applied by line 177B*k* to the pair of AND gates 170B*k*$_1$ and 170B*k*$_2$. At this time because of a signal level applied via line 183 to gate 170B*k*$_1$, it is enabled to pass the Black signal pulse to one and only one of the Black writing heads. Such output pulse of the read-out coil 176B*k*, as also applied to the anti-coincidence circuit 178B*k*, precludes it from resetting the flip-flop circuit 172B*k* so to enable the Black register 165B*k* to be again interrogated when the second clock pulse of the series appears on line 173.

Assuming only core 166B*k* of register 165B*k* was originally set to the 1 state by signal $S_{Bk}$ from the computer, the register is cleared by the first read-out so that when interrogated by the second clock pulse, its output coil 176B*k* produces no signal on output line 177B*k* and accordingly the anti-coincidence circuit 178B*k* is effective, as above described, to turn OFF the Black shift-gate 174 and to turn ON the Blue shift-gate 174B.

If, on the other hand, both cores of register 165B*k* were originally set to the 1 state by signal $S_{Bk}$ from the computer, the first read-out transfers the 1 stored in core 167B*k* to the second core 166B*k*. Thus, when register 165 is interrogated by the second pulse, its output coil 176B*k* produces a signal on output line 177B*k*. Because of the concurrent level then applied via line 180 to gate 170B*k*$_2$, the second black signal is passed to the second Black writing head. Thus, the 2-bit coded information recorded on the tape in consequence of the interrogation of the Black register 165B$k$ calls for deposition of a Black yarn bit in the belt 12. (See Color #1—Table A—and FIG. 10.)

In like manner, the registers 165B, 165M, 165R, 165Y, 165G, 165C and 165W are interrogated in that sequence with shift to the next as each is cleared until the value of the total output count as applied through the output gates to the writing heads and also to the adder circuit 182 is 2. Since the corresponding elements have been identified by the same reference number with a letter suffix corresponding to the color involved, it is considered unnecessary to repeat the description of how the register outputs are produced and the shift to the next register accomplished.

The remaining description is principally concerned with the circuitry for timing the various non-synchronously operating components of the system which has the advantage that a forced stoppage of the loom mechanism does not result in any distortion of the reproduced pattern. The loom needle shaft 63 (FIG. 16) is coupled by gears 112, 113 to the counter shaft 115 which carries a shutter disc 114. For each revolution of disc 114, i.e., for each cycle of reciprocation of the needle bar 10, the hole 116 of the disc (FIG. 17) permits light from the bulb 118 to excite the photocell 117. The resulting pulse, as shaped by the differentiating circuit 119 and the clipper circuit 120, is applied via the Start-scan bus 121 to the AND circuit 75 (FIG. 11). When the flip-flop 76 set in the state indicating that the scanner 17 is not operating, the scan Start pulse is passed by gate 75 to the control gate 77 and to the control circuitry for activating scanner light 55.

The control gate 77 also receives a pulse just as the master comes into correct position for beginning of a line scan. The means for producing this pulse includes the disc 78 on the scanner drum shaft 103, the lamp 79 and photocell 80. As the hole 81 (FIG. 13) in disc 78 passes between the lamp and the photocell, the resulting output pulse of the photocell is passed by the control gate 77 to set the scan control flip-flop 111. With flip-flop 11 so set, its output as supplied to gate 110 enables the pulses produced by the photocell 107 to pass the lamp driver 109 and so effect, as previously described, sequential scanning of the elemental areas of the master 14.

When the second control flip-flop is so reset, it produces a reverse output pulse applied to the magnet pulser 85. The resulting output of pulser 85 as applied to the stepping motor 181 advances the scanning head 70 to its next line scanning position.

During scanning of a line, each pulse from the lamp driver 109 is shaped and applied via lines 73 and 171 (FIGS. 11, 16, 15) to the first flip-flop 172B$k$ of the converter 19 to put it in readiness for read-out, as described, of the color information stored in registers 165B$k$–165W. Each such pulse is applied via line 73 to the flip-flop circuit 88 (FIG. 16) to turn ON the clock oscillator 89 which operates at suitably high-frequency, for example, 30 kc. per second. The output pulses of the clock are applied via line 173 to the converter 19 for interrogation of its registers as above described.

When as determined by the adder 182 (FIG. 15) the count of the output pulses of converter 19 attains a value of 2, such information as transmitted via line 170 to the counter or divider circuit 90 is effective to produce a converter stop pulse on line 169. This pulse as applied to flip-flop 88 is effective to stop the clock 89 and as applied to driver 168 (FIG. 15) is effective to reset to zero all cores of the converter registers 165W–165B$k$. It is to be noted that for each 1 count supplied from adder 182 to counter 90, the signal levels on its output lines 180–183 are reversed. Thus, as above explained, if a color value of 2 is stored in any one of the registers 165B$k$–165W, the corresponding pair of write-head gates will pass such color information to the associated pair of writing heads.

It shall be understood the invention is not limited to the particular arrangement disclosed and comprehends system, sub-combination and component modifications within the scope of the appended claims. For example, the scanning and computer arrangement may be disassociated from the loom mechanism for pre-recording the pattern color information on tape for subsequent use with the conveyor-charging-unit array of the loom mechanism or with a generally similar array associated with a mechanism for producing other manufactured articles such as tile mosaics.

What is claimed is:

1. A method of reproducing in a manufactured article the color and design of a photograph, painting or other graphic pattern which comprises storing at least one group of colored materials respectively substantially matching the colors in said pattern, sequentially analyzing the color of elemental areas of each line of the pattern, in the interval between the color analysis of elemental areas of one line of the pattern and the color analysis of elemental areas of a subsequent line of the pattern, performing the steps of deriving from the analysis of each elemental area a coded signal representative of the color of said area, utilizing the coded signals to select and assemble from said stored colored materials a line of colored bits corresponding in sequence and color with elemental areas of the pattern line, and transferring the line of colored bits en bloc to backing material of said article to reproduce in position and color the elemental areas of the corresponding line of the pattern.

2. A method as in claim 1 additionally including the step of distorting the pattern as analyzed to obtain a desired aspect ratio of its design as reproduced by the lines of colored bits.

3. A method of reproducing in a manufactured article the color and design of a photograph, painting or other graphic pattern which comprises continuously maintaining at an array of stations at least one group of colored materials respectively substantially matching the colors of said pattern, in turn scanning each line of said pattern sequentially to analyze the color of successive elemental areas thereof, deriving from the analysis of each elemental pattern area a binary-coded signal representative of the color of said area, applying each signal to select from said stations a bit of material of color defined by the coding, assembling the selected bits of colored material in conveyor structure repeatedly passing said stations to form thereon a line of colored bits with the bits corresponding in position and color with elemental areas of a scanned line of the pattern, and transfering each line of assembled bits in turn from said conveyor structure to backing material of said article to reproduce in position and color the elemental areas of successive lines of the pattern.

4. A method of reproducing in a rug, carpet or like manufactured textile article the color and design of a photograph, printing or other graphic pattern which comprises intermittently reciprocating a line array of hooks to pierce a backing layer, moving conveyor structure in a path lengthwise of the line of hooks as piercing said backing layer, continuously maintaining at a plurality of charging stations disposed along the path of said conveyor structure at least one group of differently colored yarns, in turn scanning each line of said pattern sequentially to analyze the color of successive elemental areas thereof, deriving from the analysis of each elemental pattern area a binary-coded signal representative of the color of said area, sequentially recording on a record element the successive coded signals produced during scanning of each pattern line, and before scanning of the next pattern line, performing the steps of scanning said record element in synchronism with passage of said conveyor structure to utilize said signals for selective charging of the conveyor structure by bits of colored yarn in position and color corresponding with elemental areas of the scanned pattern line, transferring the bits of yarns to said array of hooks as piercing the backing layer for partially drawing them as loops through said layer during the return stroke of the hooks, and separating the partially drawn bits from the hooks before advance of the backing layer to the next line position of the textile article.

5. A method as in claim 4 additionally including the step of changing the length to width ratio of the original pattern so that the reproduced textile article fits a room of non-standard size.

6. A method as in claim 4 including the additional step of selecting different lengths of yarn bits for the different colors to produce a manufactured textile article of sculptured design.

7. A method as in claim 4 in which the loops of the yarn bits are separated from the hooks in uncut state to produce a reversible textile article whose both sides are a reproduction of the pattern, one side being a reproduction in pile loops and the other a reproduction in cut pile.

8. A method as in claim 4 in which the loops of the yarn bits are separated from the hooks by cutting them to produce a reversible textile article whose both sides are each a reproduction of the pattern in cut pile.

9. A method of reproducing in a rug, carpet or like manufactured textile article the color and design of a photograph, painting or other graphic pattern which comprises intermittently reciprocating a line array of hooks to pierce a backing layer, moving conveyor structure in a path lengthwise of the line of hooks as piercing said backing layer, continuously maintaining at a plurality of charging stations disposed along the path of said conveyor structure at least one group of colored yarns respectively substantially matching the colors of said pattern, in turn scanning each line of said pattern sequentially to analyze the color of successive elemental areas thereof, deriving from the analysis of each elemental pattern area a binary-coded signal representative of the color of said area, sequentially recording on tape the successive coded signals produced during scanning of the pattern line, scanning the tape in synchronism with passage of said conveyor structure through said charging stations to utilize said signals for selective charging of the conveyor structure by bits of colored yarn in position and color corresponding with elemental areas of the scanned pattern line, erasing each recorded signal from the tape when utilized for charging of the conveyor structure with a yarn bit of corresponding color, and upon erasurue of all recorded signals effecting one cycle of reciprocation of said array of hooks for simultaneous transfer from the conveyor structure to said backing layer of a line of colored yarn bits reproducing in said article the scanned line of the pattern.

10. A system for reproducing in a manufactured article the color and design of a photograph, painting or other graphic pattern comprising at least one array of belt-charging mechanisms loaded with bits of colored materials respectively substantially matching the colors in said pattern, a multiplicity of bit-applying devices, belt-structure movable in a path adjacent said belt-charging mechanisms and said bit-applying devices, means including cyclically-operable scanning means for analyzing, and for producing coded signals representative of, the color of successive elemental areas of each line of the pattern, control means responsive to said coded signals and respectively controlling said mechanisms to charge said belt-structure with bits of colored material in an assembly corresponding in position and color with elemental areas of a pattern line, and control means responsive to completion of a cycle of said scanning means to initiate a cycle of said bit-applying devices during which they transfer from said belt-structure to a backing web of said article the assembled bits of colored material in position and color reproducing the elemental areas of the corresponding pattern line.

11. A system for reproducing in a manufactured article the color and design of a photograph, painting or other graphic pattern comprising at least one array of automatically reloaded conveyor-charging mechanisms supplied with material of different colors and each responsive to a coded signal to discharge a bit of material of corresponding color, a line array of bit-applying devices, conveyor means for receiving the bits of material discharged from said mechanisms and transporting them adjacent to said bit-applying devices, means for scanning successive elemental areas of each line of said pattern and producing coded signals each representative of the color of a corresponding pattern area and respectively controlling said conveyor-charging mechanisms to assemble on said conveyor means said discharged bits of material in position and color corresponding with the elemental areas of a pattern line, control means responsive to completion of assembly on said conveyor means of the bits corresponding with a pattern line to initiate a cycle of actuation of said bit-applying devices for application of said bits as a line of said articles with the bits in position and color corresponding with the elemental areas of said line, and control means responsive to completion of a cycle of said bit-applying devices for initiating the next cycle of operation of said scanning means and said conveyor-charging mechanisms.

12. A system for reproducing in a manufactured article the color and design of a photograph, painting or other graphic pattern comprising at least one array of automatically reloaded conveyor-charging mechanisms supplied with material of different colors, a line array of bit-applying devices, conveyor means for receiving bits of material discharged from said mechanisms and transporting them adjacent to said bit-applying devices, tape-reading means responsive to tape-recorded binary-coded color signals derived from scanning of said pattern and controlling said conveyor-charging mechanisms respectively to assemble on said conveyor means discharged bits of material in position and color corresponding with elemental areas of a pattern line, and control means responsive to completion of assembly on said conveyor means of the bits corresponding with a pattern line to initiate a cycle of operation of said bit-applying devices for application of said bits as a line of said article with the bits in position and color corresponding with the elemental areas of said line.

13. In a system for reproducing in a manufactured article the color and design of a photograph, painting or other graphic pattern and having means for transferring bits of colored material to a backing layer, an arrangement for electronic control of said transfer means comprising the combination of means for scanning the pattern line-by-line by applying pulses of light to successive elemental areas of each line, means for dividing the light from each of said areas into its primary color components, means for computing from the relative values of said components for each area a binary-coded signal representative of the color of said area, and means for sequentially recording said binary-coded signals along a strip each with a lateral displacement of its two bits definitive of a particular color.

14. In a system for reproducing in a manufactured article the color and design of a photograph, painting or other graphic pattern and having means for transferring bits of colored material to a backing layer, an arrangement for electronic control of said transfer means comprising the combination of means for scanning the pattern line-by-line by applying pulses of light to successive elemental areas of each line, means for dividing the light from each of said areas into its red, green and blue components, means for computing from the relative values of said components the color of each area as one of the combinations of a 2-bit, eight-color binary code and producing binary-coded signals corresponding with the colors computed from said areas, and means for sequentially recording said binary-coded signals on a record element for storage of information relating to the position and color of the elemental areas of said pattern.

15. In a system for reproducing in a manufactured article the color and design of a photograph, painting or other graphic pattern and having means for transferring bits of colored material to a backing layer, an arrangement for supplying said bits to said transfer means comprising the combination of conveyor means for receiving bits of colored material, an array of conveyor-loading mechanisms respectively supplied with materials of different color and each associated with means responsive to a command signal for loading the conveyor means with a bit of the supplied color material, and means for deriving the command signals for said mechanisms from a record element having binary-coded signals representative of the position and color of the elemental areas of said pattern.

16. In a system for reproducing in a manufactured article the color and design of a photograph, painting or other graphic pattern and having means for transferring bits of colored material to a backing layer, an arrangement for supplying said bits to said transfer means comprising the combination of belt structure for receiving bits of differently colored materials, and an array of belt-loading mechanisms respectively supplied with materials of different color and each having tape-reading means responsive to a binary-coded tape signal for feeding a bit of its supplied color material to said belt structure.

17. In a system for reproducing in a manufactured article the color and design of a photograph, painting or other graphic pattern and having means for transferring bits of colored material to a backing layer, an arrangement for supplying said bits to said transfer means comprising the combination of belt structure for securing bits of differently colored materials, a record tape attached to said belt structure for movement therewith and having thereon binary-coded signals, and an array of belt-loading mechanisms in the path of said belt structure and record tape, said mechanisms being respectively supplied with materials of different color and each having tape-reading means responsive to a particular binary-coded signal for feeding a bit of the correspondingly color material to said belt structure.

18. In a system for reproducing in a manufactured textile article the color and design of a photograph, painting or other graphic pattern and having tufting means for transferring colored yarn bits to a backing layer, an arrangement for supplying said yarn bits to said tufting means comprising the combination of conveyor means having lateral grooves for receiving bits of colored yarn, and an array of loading mechanisms along the path of said conveyor means and supplied with differently colored yarns, each of said loading mechanisms comprising a biased plunger normally latched in retracted position, means for feeding the yarn between said plunger and said conveyor means, a biased knife latched in position adjacent the yarn end interposed between said plunger and said conveyor means, and a binary-coded tape-reading head responsive to a correspondingly color-coded tape signal to initiate a cycle during which (1) said plunger and said knife are unlatched to load a groove of said conveyor means with a yarn bit of the demanded color, (2) said feeding means feeds another length of yarn between said plunger and said conveyor means, and (3) said plunger and said knife are returned to and latched in their original positions.

19. In a system for reproducing in a manufactured article the color and design of a photograph, painting or other graphic pattern and having tufting means for transferring colored yarn bits to a backing layer, an arrangement for supplying said colored yarn bits to said tufting means comprising the combination of a line array of bit-applying devices;

conveyor means for receiving bits of colored material and transporting them adjacent said bit-applying devices;

an array of conveyor-loading mechanisms respectively supplied with materials of different color and each having means responsive to a command signal for loading the conveyor means with a bit of the corresponding supplied color material;

means for deriving the command signals for said mechanisms from a record element having binary-coded signals;

means for providing said record element with binary-coded signals representative of the position and color of the elemental areas of said pattern comprising means for scanning the pattern line-by-line to produce for each elemental area signals representative of the intensity of its primary color components, means for computing from the relative values of said intensity signals for each area a binary-coded signal representative of the color of that area, means for recording on said record element the binary-coded signals for the elemental areas of each pattern line in turn;

control means responsive to completion of loading of said conveyor means with the bits demanded by the signals for one line of the pattern to initiate a cycle of operation of said bit-applying devices for application of said bits as the corresponding line of said article with the bits in position and color corresponding with the elemental areas of said line, and control means responsive to completion of a cycle of said bit-applying devices for initiating the next cycle of said command-signal deriving means.

20. In a system for reproducing in a manufactured textile article the color and design of a photograph, painting or other graphic pattern, the combination of a line array of hooks reciprocable to pass back and forth through an intermittently advanced backing layer, conveyor structure movable in the path of said hooks as piercing said backing layer, an array of conveyor-loading mechanisms disposed along the path of said conveyor structure and supplied with differently colored yarns and respectively responsive to different binary-coded color signals to load said conveyor structure in the interval between successive reciprocations of said hook array with a line of assembled yarn bits in position and color corresponding with a line of said pattern, said hooks pulling the line of assembled yarn bits through said backing layer as a series of open-ended loops with the loops on one side of said backing layer and the free ends on the reverse side of said layer, and means for separating the yarn loops from the hooks before they again pierce the backing layer whereby both sides of the article are each a reproduction of the pattern.

21. A combination as in claim 20 in which the last-named means removes uncut loops from the hooks whereby one side of the manufactured textile article is a looped pile reproduction of the pattern and the other side thereof is a cut-pile reproduction of the pattern.

22. A combination as in claim 20 in which the last-named means cuts the loops whereby both sides of the manufactured textile article are each a cut-pile reproduction of the pattern.

23. Apparatus for producing in a manufactured article the colors and pattern of a master composition; characterized by an arrangement for analyzing in sequence the respective colors of elemental areas along a line of said composition and deriving therefrom coded indications of said respective colors, a device for recording the coded indications in the same sequence upon a conveyor, a row of charging devices in operative relation to said conveyor for depositing thereon bits of colored material, each charging device being responsive to a code indication representing a particular color for depositing a bit of that color at the point on said conveyor corresponding to the elemental area from which the said code indication was derived, and mechanism for concurrently transferring all the color bits of a line to a backing material.

24. The method for producing in a manufactured article the colors and pattern of a master composition, characterized by scanning in sequence elemental areas along a line of said composition, indicating the color of each scanned area according to a code, recording the coded indications in the same sequence, selecting and assembling bits of material having colors and in positions corresponding respectively to the recorded indications, and transferring the assembled line of bits of material to a backing material.

References Cited by the Examiner

UNITED STATES PATENTS

| | | | |
|---|---|---|---|
| 2,069,912 | 2/1937 | Brinton | 112—79.5 |
| 2,158,533 | 5/1939 | Cavey | 28—72.2 X |
| 2,649,065 | 8/1953 | Casper | 112—79.5 X |
| 2,696,181 | 12/1954 | Lacey | 112—266 |
| 2,828,702 | 4/1958 | Hall | 112—79.5 |

FOREIGN PATENTS

| | | |
|---|---|---|
| 602,615 | 8/1960 | Canada. |

JORDAN FRANKLIN, *Primary Examiner.*

DAVID J. WILLIAMOWSKY, *Examiner.*